March 14, 1961  J. G. HART  2,974,341
CONNECTOR FOR WINDSHIELD WIPER BLADE
Filed Sept. 24, 1956
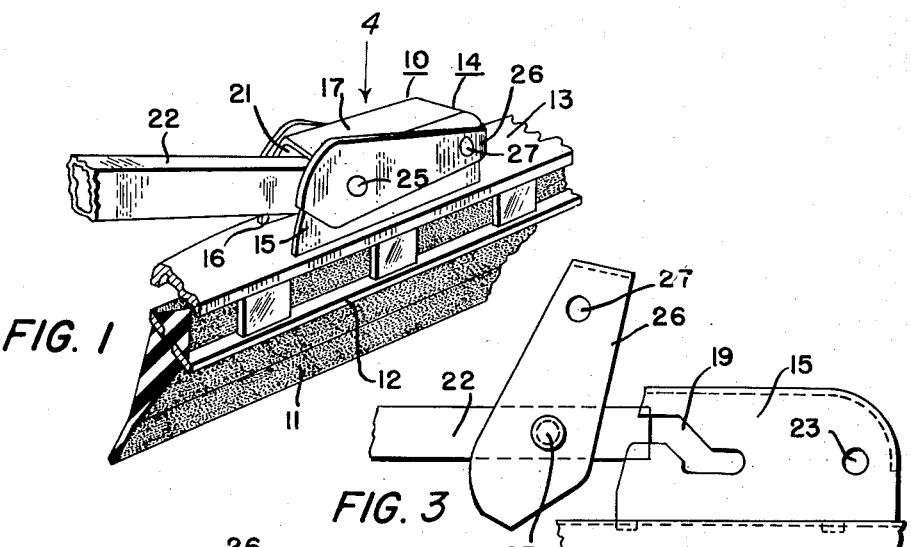
INVENTOR.
JOHN G. HART
BY
S. H. Strickland
His Attorney

United States Patent Office 2,974,341
Patented Mar. 14, 1961

2,974,341

CONNECTOR FOR WINDSHIELD WIPER BLADE

John G. Hart, Rochester, N.Y., assignor to General Motors Corporation, Detroit, Mich., a corporation of Delaware Filed Sept. 24, 1956, Ser. No. 611,466

8 Claims. (Cl. 15—250.32)

This invention pertains to windshield wipers, and particularly to an improved connector for a wiper blade assembly adaptable for attachment to a wiper arm.

Heretofore, considerable difficulty has been caused by twisting of the arm relative to the blade due to forces imposed on the connection between the blade and arm during wiping. The present invention is directed to a connector for a wiper blade and arm of the type having an arm of rectangular cross section, and including means for securing and retaining the blade and arm in the proper alignment at all times. Accordingly, among my objects are the provision of an improved connector for detachably connecting a wiper blade and a wiper arm; the further provision of a connector having cooperable parts mounted on the end of a wiper arm and a wiper blade; and a still further provision of a connector including means preventing disengagement between the wiper arm and wiper blade due to the forces imposed thereon during wiping.

The aforementioned and other objects are accomplished by incorporating a pin and slot connection between the arm and blade and restraining the arm so as to prevent disengagement thereof from the blade connector. Specifically, the present invention is directed to a connector particularly adaptable for use of a curved wiper blade of contemporary design. Thus, the wiper blade includes a pressure distributing linkage including a holder, and secondary pressure distributing members which are connected to a flexible squeegee unit at longitudinally spaced points. The holder has attached thereto an inverted channel member, or socket having open ends. The channel socket member is secured to the holder, and the side walls thereof are formed with spaced slots having irregular contour. The slots have closed ends and are adapted to receive a pin, or rivet, secured to the outer end of a wiper arm.

The outer end of the wiper arm which carries the pin has attached thereto a yoke. More particularly, the yoke is pivotally connected to the outer end of the arm by the pin, or rivet. The yoke has a pair of depressed detents thereon which are engageable with apertures in the side walls of the channel socket member, so that when the arm is inserted into the connector, the yoke, or latch is pivoted over the end of the socket closing the slots and securely positioning the arm in the socket member.

Further objects and advantages of the present invention will be apparent in the following description, reference being had to the accompanying drawings wherein the preferred embodiment of the present invention is clearly shown.

In the drawing:

Fig. 1 is a fragmentary view partly in section and partly in elevation of a wiper blade assembly including the connector means of this invention.

Fig. 2 is a fragmentary view in elevation depicting the manner in which the arm is inserted into the connector.

Fig. 3 is a fragmentary sectional view in elevation illustrating a further step in connecting the arm to the blade.

Fig. 4 is a top view in elevation of the connector of this invention.

Figs. 5 and 6 are sectional views taken along lines 5—5 and 6—6 of Fig. 4 respectively.

Fig. 7 is a fragmentary sectional view of a modified embodiment.

Fig. 8 is a fragmentary sectional view of the modified embodiment of Fig. 7 illustrating the connection in a completed form.

With particular reference to Fig. 1, the connector of this invention is designated generally by the numeral 10. The connector is associated with a contemporary flexible wiper blade including a rubber wiping element 11 having a flexible backing strip 12. In accordance with conventional practice, the flexible backing strip 12 is adapted to receive pressure from the wiper arm at longitudinally spaced points through a pressure distributing linkage comprising secondary pressure distributing members, not shown, which are operatively connected to a primary pressure distributing member, or holder 13. The connector includes a socket member, or channeled member, 14 which is securely attached to the holder 13, or support. The socket member 14 includes spaced side walls 15 and 16, a top wall 17, and an end wall of curvilinear shape. The socket member 14 is secured to the support, or holder 13, by means of ears depending from the side walls 15 and 16. As seen in Fig. 5, the ears 18 extend through slots in the holder 13 and are bent so as to securely attach the socket thereto. In addition, the side walls 15 and 16 of the socket member are formed with aligned slots 19 and 20, having closed ends. The slots 19 and 20 include portions parallel to each other and inclined portions connecting the aforementioned parallel portions. As seen clearly in Fig. 1, the inner end of the socket member 14 is open, as designated by numeral 21.

The spaced side walls 15 and 16 are also formed with apertures indicated by numerals 23 and 24. The apertures 23 and 24 constitute sockets for detents to be described later.

As alluded to hereinbefore, the connector of this invention is particularly designed for use with an arm having a rectangular cross section. However, this is only by way of example and is not to be construed as a limitation. Thus, as shown in Fig. 1, the arm 22 of rectangular cross section has a pin, or rivet, extending transversely thereof. The pin is designated by the numeral 25, and pivotally supports a yoke 26. The yoke 26 is designed to telescopically receive within its legs the socket member 14. In addition, the yoke 26 is formed with depressed portions 27 and 28 which constitute detents designed to be received by the depressions 23 and 24 of the side walls 15 and 16 of the socket member.

The manner in which the wiper arm is detachably connected to the wiper blade is depicted in Figures 2 and 3. Thus, as shown in Fig. 3, the arm 22 having the pin, or rivet 25, is inserted into the socket member 14. The pin 25 is received by the spaced slots 19 and 20. The arm is inserted so that the pin abuts the closed end of the slots 19 and 20 after which the yoke 26 is pivoted about the pin 25 so as to telescopically engage the socket 14. Thereafter, the yoke 26 is moved to a position where the detents 27 and 28 engage the apertures 23 and 24 in the socket member so as to securely retain the arm connected to the blade.

With particular reference to Figs. 7 and 8, a modified embodiment of the connector means of this invention is shown, similar numerals depicting similar parts throughout the several views. Figs. 7 and 8 show the socket member 14 is formed with an end of wall 29 which is struckup from the main body of the socket. In this embodiment, the yoke 26 depresses the upstruck end 29 so as to form a more secure connection between the wiper arm and the wiper blade. In all respects, the modified embodiment of Figures 7 and 8 is identical to that described hereinbefore. In addition, the yoke 26 has a dimple 30 arranged to engage the end 29 as seen in Figure 8.

From the aforegoing it is readily apparent that the present invention provides a readily detachable blade-to-arm connector which securely retains the blade in assembled relation with the arm. Moreover, the connector of this invention prevents movement of the arm relative to the blade due to forces imposed thereon during wiper operation.

In addition, the connector of this invention will prevent disengagement between the arm and wiper blade even though the locking yoke becomes unlatched due to the arm pressure reacting on the pin and slot connection.

While the form of embodiment of the invention as herein disclosed constitutes a preferred form, it is to be understood that other forms might be adopted, as may come within the scope of the claims which follow.

What is claimed is as follows:

1. A connector for establishing a connection between a windshield wiper blade unit and a windshield wiper arm unit, including, a socket member carried by one of said units and having a top wall, slotted side walls and an open end, a latch member, and a pin pivotally connecting said latch member to an entering part for said socket member and carried by the other of said units, said pin being engageable with the slotted side walls of said socket member and said latch member being telescopically engageable with said socket member for retaining said entering part therein.

2. A connector for establishing a connection between a windshield wiper blade unit and a windshield wiper arm unit, including, a socket member in the form of an inverted channel carried by one of said units and having an open end, and spaced side walls with aligned slots therein a latch member in the form of a yoke, a transversely extending pin pivotally connecting said latch member to an entering part of the other of said units, said pin engaging the aligned slots in the side walls of said socket member and said latch member being telescopically engaged with said socket member for detachably securing said entering part therein.

3. A support, a connector carried by said support, said connector including an inverted channel member having spaced side walls with aligned slots therein, said slots having closed ends, a yoke member pivotally connected to an entering part for said channel member, and a pin pivotally connecting said yoke member to said entering part and adapted for reception in the slots of said channel member, said yoke member being engageable with said channel member to detachably secure the entering part therein.

4. A support, a connector carried by said support, said connector including an inverted channel member having an open end, said channel member having spaced side walls with aligned closed slots therein, a yoke pivotally connected to a part adapted to enter said open end of the channelled member, and a pin pivotally connecting said yoke to said entering part, said pin being adapted for reception in said slots, said yoke being adapted to telescopically receive said channelled member for detachably securing the entering part in the open end thereof.

5. A support, a connector carried by said support, said connector comprising an inverted channel member having open ends, an entering part adapted to be inserted into said open ended channel member in telescopic relation, a yoke, and a transversely extending pin pivotally connecting said yoke to said entering part, said channel member having aligned closed slots in opposed side walls thereof adapted to receive said pin, said yoke being adapted for movement relative to said arm to telescopically engage said channel member to detachably retain the entering part therein.

6. The combination set forth in claim 5 wherein said inverted channel member includes an outstruck curved end portion having an edge engageable with said yoke to secure the yoke in position.

7. The combination set forth in claim 5 wherein said yoke includes detent means engageable with said channelled member.

8. The combination set forth in claim 7 wherein said detent means comprise apertures in the spaced side walls of said channel member and cooperable projections in said yoke.

References Cited in the file of this patent

UNITED STATES PATENTS

| | | |
|---|---|---|
| 1,447,967 | Davis | Mar. 13, 1923 |
| 1,496,466 | Jackson | June 3, 1924 |
| 2,073,157 | Kempel | Mar. 9, 1937 |
| 2,091,928 | Horton | Aug. 31, 1937 |
| 2,429,926 | Davis | Oct. 28, 1947 |
| 2,616,112 | Smulski | Nov. 4, 1952 |

FOREIGN PATENTS

| | | |
|---|---|---|
| 814,957 | Germany | Sept. 27, 1951 |
| 853,498 | France | Dec. 7, 1939 |